Figure 1:
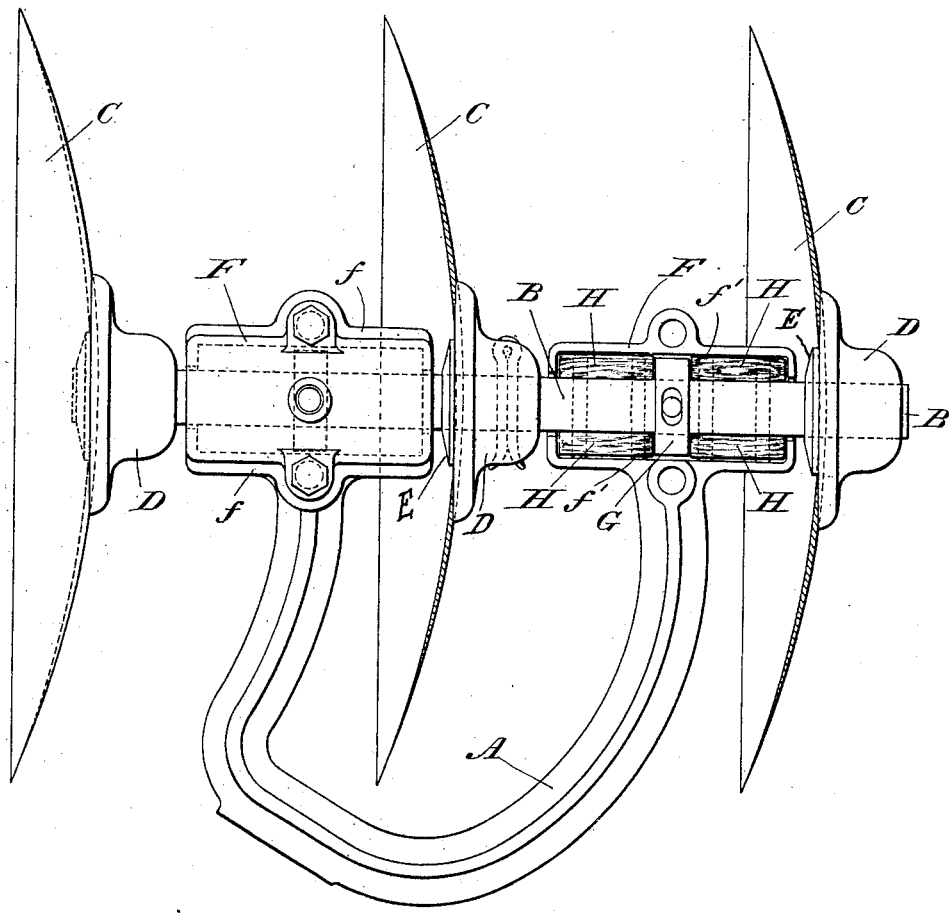

No. 826,795. PATENTED JULY 24, 1906.
G. W. MIXTER.
DISK CULTIVATOR.
APPLICATION FILED APR. 19, 1906.

2 SHEETS—SHEET 1.

WITNESSES
Harry King.
I. M. Lauber.

INVENTOR
George W. Mixter
By Julian C. Dowell
his Attorneys.

No. 826,795. PATENTED JULY 24, 1906.
G. W. MIXTER.
DISK CULTIVATOR.
APPLICATION FILED APR. 19, 1906.
2 SHEETS—SHEET 2.
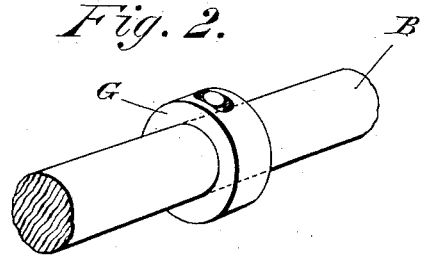
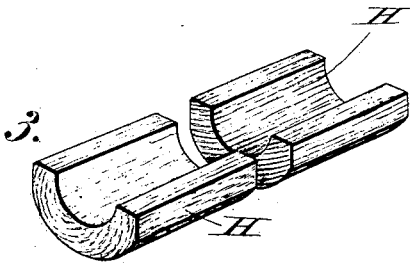
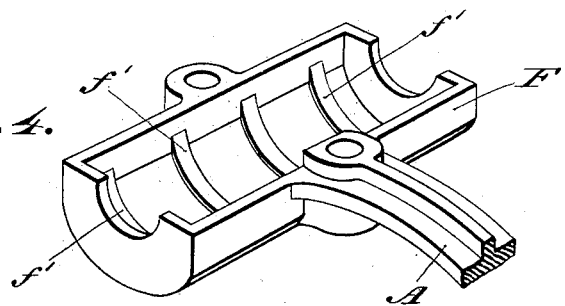
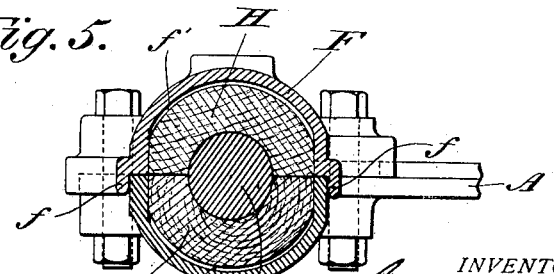

UNITED STATES PATENT OFFICE.

GEORGE W. MIXTER, OF MOLINE, ILLINOIS, ASSIGNOR TO DEERE & COMPANY, OF MOLINE, ILLINOIS, A CORPORATION OF ILLINOIS.

DISK CULTIVATOR.

No. 826,795.     Specification of Letters Patent.     Patented July 24, 1906.

Application filed April 19, 1906. Serial No. 312,731.    REISSUED

*To all whom it may concern:*

Be it known that I, GEORGE W. MIXTER, a citizen of the United States, residing at Moline, in the county of Rock Island and State of Illinois, have invented certain new and useful Improvements in Disk Cultivators; and I do hereby declare the following to be a full, clear, and exact description of the invention, such as will enable others skilled in the art to which it appertains to make and use the same.

This invention relates to disk cultivators, and especially to the means of attachment of the rotary disks to the standard, arm, shank, yoke, or other member of the cultivator rig or frame which carries the disk, the objects of my improvement being to relieve the hubs of the disks from the end thrust or pressure due to the resistance of the earth to the disks in their travel, to increase the efficiency and durability of the bearings, avoid wear of the metal parts, to obviate injurious effects from dirt and grit, and to provide a simple and practical disk-gang construction. These results are attained by means substantially as hereinafter described, and particularly pointed out in the claims.

In the accompanying drawings, which form a part of this specification, the invention is shown embodied in a cultivator-gang comprising three disks mounted on a shaft, which is carried by a yoke straddling the middle disk, said yoke being adapted for attachment to a cultivator-rig carried by the implement; but it will be understood that the invention may be embodied in other forms or arrangements.

The construction of the cultivator-rig and frame of the implement does not enter into the present invention, and therefore these parts are not illustrated.

Figure 1 of the drawings is an elevation of said cultivator-gang embodying my invention, parts thereof being represented in section. Fig. 2 is a perspective view of a fragment of the disk-shaft, showing a collar thereon which takes the end thrust. Fig. 3 shows two of the semicircular wooden bushings employed in the disk-bearings. Fig. 4 is a perspective view of one of the lower half-boxes. Fig. 5 is a central vertical section through one of the bearings.

Referring in detail to the drawings, the yoke A carries the shaft or spindle B, on which the cultivator-disks C are affixed. These disks may be rigidly mounted on the shaft by any suitable means, as by seating the disks in the hubs D and clamping them thereto by the nuts or rivets E, the hubs G being pinned or otherwise rigidly secured on the shaft. The shaft-bearings F are composed each of two half-boxes, the lower one of which is preferably integral with its yoke-arm, while the upper half-box or cap is held down on the lower one by suitable bolts in the usual way. The upper half-box is also shown having a bottom flange $f$ overlying the top of the lower half-box, as shown more clearly in Fig. 5, to protect the bearings from dirt or soil which may fall from the disks. It is observed that one bearing is arranged between each pair of disks. Between the hubs D and the adjacent ends of the bearings F there is sufficient space to permit dirt to fall loosely between these parts and under ordinary circumstances not to be clogged or wedged into this space. The same is true of the space between the nuts E and the opposite ends of the bearings F, this space being wider on the outside than next the shaft to prevent dirt clogging. At the center of each bearing and pinned or otherwise rigidly secured on the shaft is a collar G, and at both sides of said collar wood bushings H (desirably of maple) are fitted on the shaft within the bearing-boxes, which boxes are of sufficient size to hold said bushings. The collars G in conjunction with bushings H take the end thrust in both directions, which acts on the shaft by reason of the resistance of the earth to the disks in their travel. The half-boxes are shown having internal segmental ribs $f'$, which are slightly raised from the inner walls of the half-boxes, and the bushings H are seated on said ribs. There are four of the bushings H for each bearing, two half-bushings for the lower half-box and two for the upper half-box, arranged at opposite sides of the collar G.

As shown in Fig. 5, the half-boxes in which the bushings are fitted are interiorly shaped so as to prevent the bushings from turning, the opposite sides of the bushings being shown with flat faces abutting against the flat interior sides of the bearing-boxes. These bushings H, which may of course be replaced when worn, take the end thrust and wear from the collars G and also receive the wear of the shaft in its rotation, thereby providing bearings which are perfectly adapted to implements of this character, protecting the metal parts and avoiding the usual abrading due to entrance of dirt or grit, the bearing being, moreover, protected from the entrance of dirt, as before explained.

Having thus fully described my invention, what I claim as new, and desire to secure by Letters Patent of the United States, is—

1. A disk gang comprising a disk-shaft, a plurality of disks thereon, a shaft-bearing between adjacent disks consisting of a two-part bearing-box, a collar on the shaft within said bearing-box, and wood bushings fitted in said box around the shaft at opposite sides of said collar.

2. A disk gang comprising a disk-shaft, a plurality of disks thereon, a shaft-bearing between adjacent disks consisting of a two-part bearing-box, the upper half-box having a bottom flange overlying the top of the lower half-box, there being a substantial space between each end of the bearing-box and the hub portion of the adjacent disk, a collar secured on the shaft in the bearing-box, and wood bushings fitted on the shaft at opposite sides of said collar within the bearing-box.

3. A disk gang comprising a disk-shaft, a plurality of disks thereon, a shaft-bearing between adjacent disks consisting of a two-part bearing-box, a collar on the shaft within said bearing-box, and wood bushings fitted on the shaft within the bearing-box at each side of said collar, the bushings at each side of the collar consisting of two half parts fitted respectively in the half-boxes.

4. A disk gang comprising a yoke, alined bearings carried by the yoke-arms, each consisting of two half-boxes one of which is integral with its yoke-arm while the other is detachably secured thereon, a shaft journaled in said bearings, a plurality of disks on said shaft, the middle disk being straddled by the yoke, a collar on the shaft in each bearing-box, and wood bushings in each bearing-box fitted on the shaft at opposite sides of the respective collars.

In testimony whereof I affix my signature in presence of two witnesses.

GEORGE W. MIXTER.

Witnesses:
CHAS. N. STONE,
E. L. MAYALL.